(12) United States Patent
Vatmakhter

(10) Patent No.: US 9,469,216 B2
(45) Date of Patent: Oct. 18, 2016

(54) FITTING FOR AN ADJUSTING DEVICE OF A MOTOR VEHICLE SEAT AND A METHOD FOR THE PRODUCTION THEREOF

(75) Inventor: Eduard Vatmakhter, Hilden (DE)

(73) Assignee: Johnson Controls Metals and Mechanisms GmbH & Co., Solingen (DE)

( * ) Notice: Subject to any disclaimer, the term of this patent is extended or adjusted under 35 U.S.C. 154(b) by 0 days.

(21) Appl. No.: 14/233,559

(22) PCT Filed: Jul. 5, 2012

(86) PCT No.: PCT/EP2012/063153
§ 371 (c)(1),
(2), (4) Date: Apr. 4, 2014

(87) PCT Pub. No.: WO2013/010810
PCT Pub. Date: Jan. 24, 2013

(65) Prior Publication Data
US 2014/0319893 A1    Oct. 30, 2014

(30) Foreign Application Priority Data

Jul. 20, 2011   (DE) .................. 10 2011 051 988

(51) Int. Cl.
| B60N 2/225 | (2006.01) |
| F16H 57/00 | (2012.01) |
| B60N 2/02  | (2006.01) |
| B60N 2/68  | (2006.01) |
| B60N 2/16  | (2006.01) |
| B60N 2/18  | (2006.01) |

(Continued)

(52) U.S. Cl.
CPC ............ *B60N 2/02* (2013.01); *B60N 2/1655* (2013.01); *B60N 2/1867* (2013.01); *B60N 2/225* (2013.01); *B60N 2/2251* (2013.01); *B60N 2/42* (2013.01); *B60N 2/4435* (2013.01); *B60N 2/682* (2013.01); *F16H 57/0025* (2013.01); *Y10T 29/49464* (2015.01)

(58) Field of Classification Search
CPC ..................... F16H 57/0025; B60N 2/225
See application file for complete search history.

(56) References Cited

U.S. PATENT DOCUMENTS

| 2,108,080 A * | 2/1938 | Schultz, Jr. et al. .......... 164/113 |
| 3,972,743 A * | 8/1976 | Dollar et al. ................. 148/705 |
| 4,570,510 A * | 2/1986 | Babak .......................... 475/180 |

(Continued)

FOREIGN PATENT DOCUMENTS

| CN | 1036251 A | 10/1989 |
| CN | 1461269 A | 12/2003 |

(Continued)

*Primary Examiner* — Derek D Knight
*Assistant Examiner* — David Morris
(74) *Attorney, Agent, or Firm* — McGlew and Tuttle, P.C.

(57) ABSTRACT

A fitting for a motor vehicle seat adjusting device and a method for producing same is based on a relatively adjustable fitting top part and a fitting bottom part, a transmission gear unit, in operative connection with the fitting parts, for adjusting the fitting top part relative to the fitting bottom part, and a drive shaft (21) extending at one end through the fitting in a longitudinal axial direction of a fitting axis and in engagement with the gear unit. The drive shaft (21) is wobble riveted to a bushing (6) to axially secure the fitting top part (2) relative to the fitting bottom part (3). The bushing is arranged in an opening (11), coaxially to the fitting axis, of the fitting top part or fitting bottom part. The drive shaft rests, on the side opposite the bushing, with a stop (12) against the fitting.

7 Claims, 6 Drawing Sheets

(51) Int. Cl.
 *B60N 2/44* (2006.01)
 *B60N 2/42* (2006.01)

(56) References Cited

U.S. PATENT DOCUMENTS

| | | | |
|---|---|---|---|
| 4,811,312 A * | 3/1989 | Cole | ............................ 368/107 |
| 4,836,606 A | 6/1989 | Werner | |
| 2004/0251727 A1 | 12/2004 | Beneker et al. | |

FOREIGN PATENT DOCUMENTS

| | | |
|---|---|---|
| DE | 38 55 008 T2 | 8/1996 |
| DE | 37 23 204 C2 | 2/1998 |
| DE | 102 19 199 A1 | 11/2003 |
| DE | 102 50 987 A1 | 5/2004 |
| DE | 10 2005 015831 B3 | 9/2006 |
| DE | 10 2005 024942 A1 | 12/2006 |
| DE | 103 27 090 B4 | 3/2007 |
| DE | 10 2006 036 732 B4 | 5/2008 |
| DE | 101 09 660 B4 | 10/2008 |
| EP | 1 456 547 B1 | 5/2007 |
| GB | 1 237 796 A | 6/1971 |
| JP | 61-9052 U | 1/1986 |
| JP | 03-118006 A | 5/1991 |
| JP | 2004-237019 A | 8/2004 |
| JP | 2005-161034 A | 6/2005 |
| JP | 2006-034729 A | 2/2006 |
| WO | 92/20548 A1 | 11/1992 |
| WO | 02/064 397 A1 | 8/2002 |

\* cited by examiner

FITTING FOR AN ADJUSTING DEVICE OF A MOTOR VEHICLE SEAT AND A METHOD FOR THE PRODUCTION THEREOF

CROSS REFERENCE TO RELATED APPLICATIONS

This application is a United States National Phase Application of International Application PCT/EP2012/063153 filed Jul. 5, 2012 and claims the benefit of priority under 35 U.S.C. §119 of German Patent Application DE 10 2011 051 988.2 filed Jul. 20, 2011, the entire contents of which are incorporated herein by reference.

FIELD OF THE INVENTION

The invention relates to a fitting as well as a method to produce a fitting, in particular for an adjusting device of a motor vehicle, comprising:
- a fitting top part and a fitting bottom part that is adjustable relative to the fitting top part,
- a transmission gear unit, which is in operative connection with the fitting top part and fitting bottom part, for adjusting the fitting top part relative to the fitting bottom part, and
- a drive shaft extending at one end through the fitting in a longitudinal axial direction of a fitting axis and in engagement with the gear unit.

BACKGROUND OF THE INVENTION

Fittings of the initially cited type allow an adjustment, established by the gear unit, of the fitting top part relative to the fitting bottom part by driving the drive shaft, wherein components that can be articulated thereto can be adjusted by the relative movement of the two fitting parts relative to each other.

The area of application of such fittings can vary widely, and their use is also conceivable e.g. in the area of drives for blinds. The primary area of use of the generic fittings relates, however, to the adjustment of motor vehicle seats, the fittings being used to adjust motor vehicle seat components relative to each other. A typical area of use is to use the fittings as backrest adjusters, seat inclination adjusters, or seat height adjusters.

Particularly when the fitting is used for adjusting devices of a motor vehicle seat, it must be ensured that the fitting top part is arranged on the fitting bottom part in a secure position even in a crash in order to keep the seat from collapsing. The disadvantage of known seat fittings of the aforementioned type is that, in certain circumstances, they do not withstand loads acting in an axial direction in the installed position. Consequently, the fitting top part separates from the fitting bottom part which can be associated with a deformation of the seat structure that affects safety. The drive shaft which substantially retains the position of the fitting top part and fitting bottom part relative to each other and which rests e.g. on a shaft shoulder on one side and on the fitting via a lock ring on the other side, the lock ring being arranged on a shaft end extending through the fitting, as well as the additional arrangement of a retaining ring, are not suitable for reliably securing the position of the fitting parts in a crash.

SUMMARY OF THE INVENTION

The object of the invention is to provide a fitting as well as a method to produce a fitting of the initially-cited kind in which a reliable arrangement of the fitting parts on each other is ensured even under high loads.

According to the invention, a fitting for an adjusting device of a motor vehicle seat is provided comprising a fitting first part with first part internal toothing and a fitting second part with second part internal toothing arranged coaxially with respect to the first internal toothing, the fitting second part being adjustable relative to the fitting first part, one of the fitting first part and the fitting second part having an opening that is arranged coaxially to a fitting axis. A transmission gear unit is in operative connection with the fitting first part and with the fitting second part for adjusting the fitting first part relative to the fitting second part. The transmission gear unit includes planet gears rotatably arranged about a longitudinal axis, the planet gears being in engagement with the first and second internal toothings. A bushing is arranged in the opening. A drive shaft extends at one end through the fitting, in a longitudinal axial direction of the fitting axis. The drive shaft is in engagement, via a pinion, with the planet gears of the gear unit and axially secures a position of the fitting first part relative to the fitting second part. The drive shaft is wobble riveted at one end to the bushing. The drive shaft has a stop on a side opposite the bushing. The stop acts against one of the fitting first part and the fitting second part. The fitting may be at least partially thermally treated within a temperature range of 150° C. to 250° C. for a duration of 10 to 45 minutes.

It is characteristic of the fitting according to the invention that a drive shaft for axially securing the position of the fitting top part relative to the fitting bottom part is wobble riveted at one end to a bushing arranged in an opening, arranged coaxially to the fitting axis, in the fitting top part or fitting bottom part, the drive shaft resting, on the side opposite the bushing, with a stop against the fitting.

According to the invention, the drive shaft secures the fitting parts on each other in an axial direction by means of the stop resting against an outside of a fitting part and the shaft end wobble riveted to a bushing on the opposite side. The bushing is arranged in an opening on the side of the fitting opposite the stop. The shaft end wobble riveted in a known manner to the bushing ensures that the fitting top part is securely arranged on the fitting bottom part, the fitting parts being clamped between the bushing and stop in an axial direction. At the same time, the bushing allows the drive shaft to rotate, the relative movement occurring between the bushing and the opening accommodating it.

The use of a drive shaft wobble riveted at one end to secure the position of the fitting parts on each other ensures particularly high joint strength. In contrast to alternative types of securing using the drive shaft which necessitates a structural weakening of the cross-section, for example when a locking ring is used, the shaft end which is wobble riveted to the bushing possesses a high pullout resistance. The load arising in a crash as well as the loads arising from misuse where it is, for example, assumed that a person entering the vehicle steps on the hand wheel arranged on the drive shaft, are not suitable to separate the fitting parts from each other.

The transmission gear unit for adjusting the fitting top part relative to the fitting bottom part by a drive of the drive shaft engaged with the gear unit can be embodied in any manner. According to one particularly advantageous embodiment of the invention, the fitting top part has a first inner toothing, the fitting bottom part has a second inner toothing arranged concentric to the first inner toothing, at least two planet gears rotatably arranged about their longitudinal axis are engaged with the first and second inner toothings on the fitting top part and fitting bottom part, and the drive shaft, one end thereof extending through the fitting, is in operative connection with at least two planet gears by means of a pinion.

According to this embodiment of the invention, the fitting top part is adjusted relative to the fitting bottom part by means of a planetary gear unit, and the planet gears can be driven by means of a sun wheel in operative connection with the drive shaft, or also directly by means of a pinion of the drive shaft engaged with the planet gears. When in their installed position, the planet gears are simultaneously engaged with the first and second inner toothings which have an equivalent crown and root diameter but possess a different number of teeth in order to achieve a displacement of the fitting top part relative to the fitting bottom part by driving the planet gears. Such a fitting having such a gear unit has highly precise adjustment while at the same time intrinsically inhibiting the set position, and can be produced in a particularly compact and easy manner.

The shaft can be wobble riveted in any manner desired, and wobble riveting preferably yields a rotationally fixed connection between the shaft end and the bushing such that rotating the drive shaft results in a relative movement of the bushing surfaces relative to the fitting top part or fitting bottom part. According to one particularly advantageous embodiment of the invention, one end of the drive shaft is wobble riveted integrally with the bushing. This embodiment of the invention ensures a particularly high rotational fixing of the drive shaft relative to the bushing. It is particularly advantageous for the bushing to have a profiled contour in the area of contact with the shaft end of the drive shaft that is adapted to the shaft end after the wobble riveting process. Such an embodiment offers particularly effective rotational fixing and securing of the position of the fitting parts on each other.

The material used to produce the drive shaft is generally freely selectable, and normally the selection is made taking into account the deformation occurring in the wobble riveting process. According to one particularly advantageous embodiment of the invention, the drive shaft is formed from a material whose stress can be reduced by thermal treating within a temperature range of 150° C. to 250° C. This embodiment of the invention is based on the realization that the fitting top part and fitting bottom part are clamped together very strongly in the axial direction by the wobble riveting process which, in certain instances, makes adjusting the drive shaft infeasible, or only feasible with a significant exertion of force due to the initial stress. Using a material that is stress reducible by thermal treating within the temperature range of 150° C. to 250° C. makes it possible to reduce the internal stress by a simple thermal treatment during which the properties of the drive shaft are not altered. The achievement of thermal treating is that the fitting parts still lie against each other without play, but the gear unit runs smoothly.

According to one particularly advantageous embodiment of the invention, the drive shaft is produced from a zinc die-cast alloy. The advantage of using a zinc die-cast alloy is that even complex drive shaft geometries can be economically produced. The drive shaft made of zinc die-cast alloy can be produced within narrow tolerances, and the necessity of reworking can be excluded. Furthermore, the advantage of using a zinc die-cast alloy for producing the drive shaft is that the added heat that arises during finish work, e.g. during cathode electrocoating with e.g. drying temperatures of approximately 180° C. to 200° C. and a drying time of approximately 30 minutes, is suitable for releasing the intrinsic stresses that arise during wobble riveting, and for producing a smoothly operating fitting without requiring additional, separate thermal treatments.

As noted at the onset, the fitting can in principle be used in many areas within the automotive field. According to one particularly advantageous embodiment of the invention, the fitting is, however, provided to adjust the inclination of a seat surface, wherein according to a development of the invention, fastening means are arranged on the fitting bottom part, especially threaded bolts to fasten the fitting bottom part to a seat frame, especially to an inside of a seat frame, and a tab is arranged on the fitting top part for arranging a transfer tube. This embodiment of the invention makes it easy to mount the fitting on a seat frame and use it for seat inclination adjustment. The fitting bottom part fastened to the seat frame, especially to the inside of the seat frame by means of the threaded bolts, is therefore fixed relative thereto, whereas the fitting top part can be adjusted relative to the fitting bottom part so that an adjustment of the inclination can be made by means of the transfer tube arranged on the tab, the transfer tube being fastened at an appropriate location on the motor vehicle seat.

According to one particularly advantageous embodiment of the invention, the fitting bottom part has a projection which extends radially into a recess in the fitting top part. With such an embodiment of the fitting, a limitation of the rotary angle of the fitting top part relative to the fitting bottom part can be easily achieved. Additional limitations of the angle can be dispensed with according to this embodiment of the invention.

The invention also achieves the initially-cited object by a method according to the invention. The following procedural steps are executed for the play-free and low-stress assembly of a fitting for an adjusting device of a motor vehicle seat, especially a seat inclination adjustment:

Assembly of the fitting from:
a fitting top part having a first internal toothing,
a fitting bottom part which is adjustable relative to the fitting top part about a fitting axis and has a second internal toothing arranged coaxially with respect to the first internal toothing,
at least two, preferably three planet gears rotatably arranged about their longitudinal axis which are in engagement with the first and second internal toothings, and
a drive shaft, one end of which extends through the fitting, which is engaged by means of a pinion with the at least two, preferably three planet gears,
wobble riveting the end of the drive shaft extending through the fitting by means of a bushing arranged in an opening in the fitting top part or fitting bottom part, and
finally heating the fitting to a temperature of 150° C. to 250° C. for a duration of 10 to 45 minutes.

By means of the method according to the invention, a fitting can be provided that ensures a reliable arrangement of the fitting top part on the fitting bottom part, wherein the connection is stable even under high loads such as arise during a crash or misuse. The method according to the invention furthermore ensures that the thermal treatment following wobble riveting decreases the stresses arising from wobble riveting between the fitting top part and fitting bottom part which can cause the fitting to only actuate sluggishly. The thermal treatment provided according to the method can occur in a separate work step. To the extent that the fitting undergoes a subsequent treatment such as a cathodic electrocoating with a corresponding addition of heat, a separate thermal treatment of the fitting can be dispensed with.

An exemplary embodiment of the invention is explained in the following with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
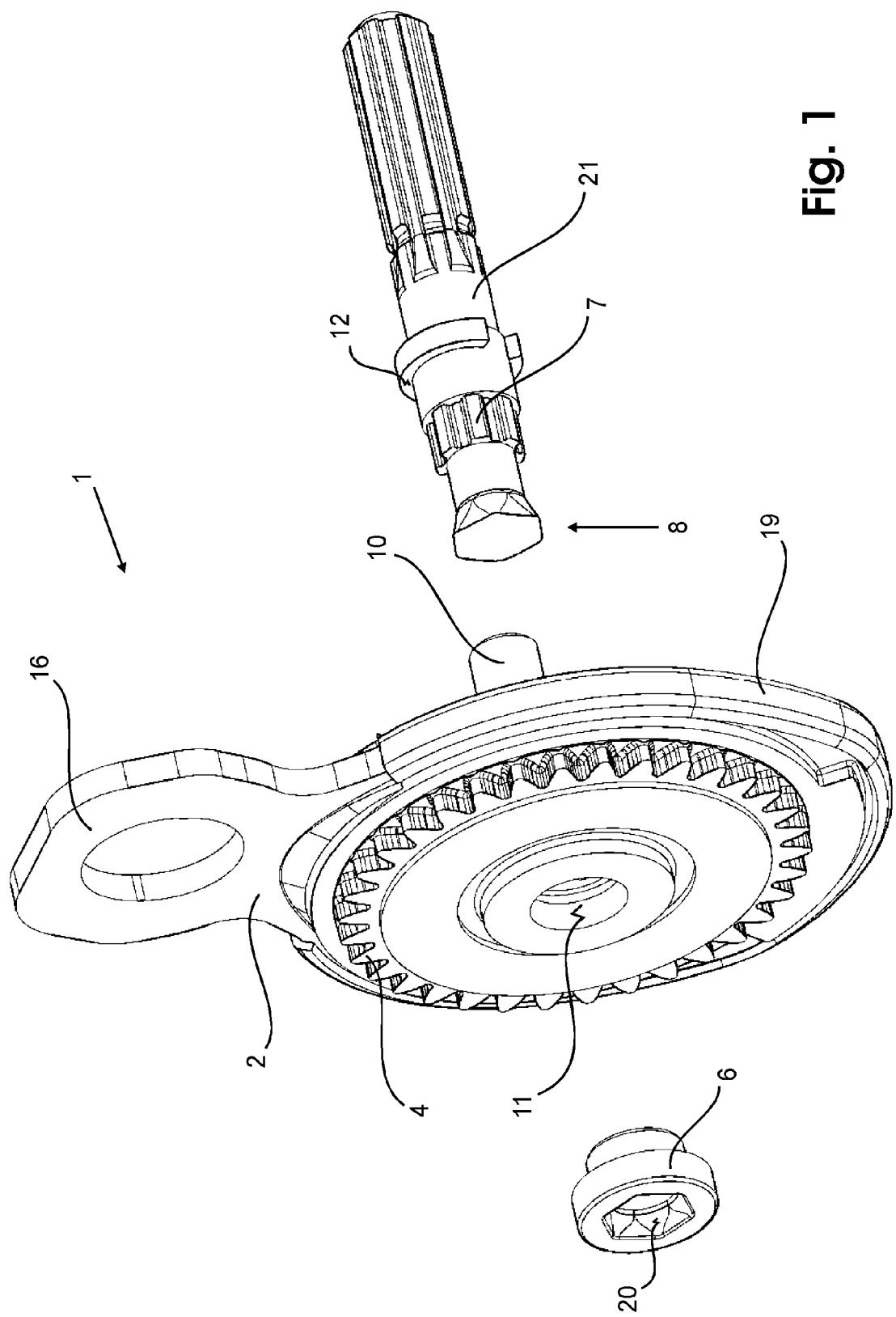
FIG. 1 is a perspective view of a seat fitting 1 with a bushing and drive shaft arranged in an exploded view.
Figure 2:
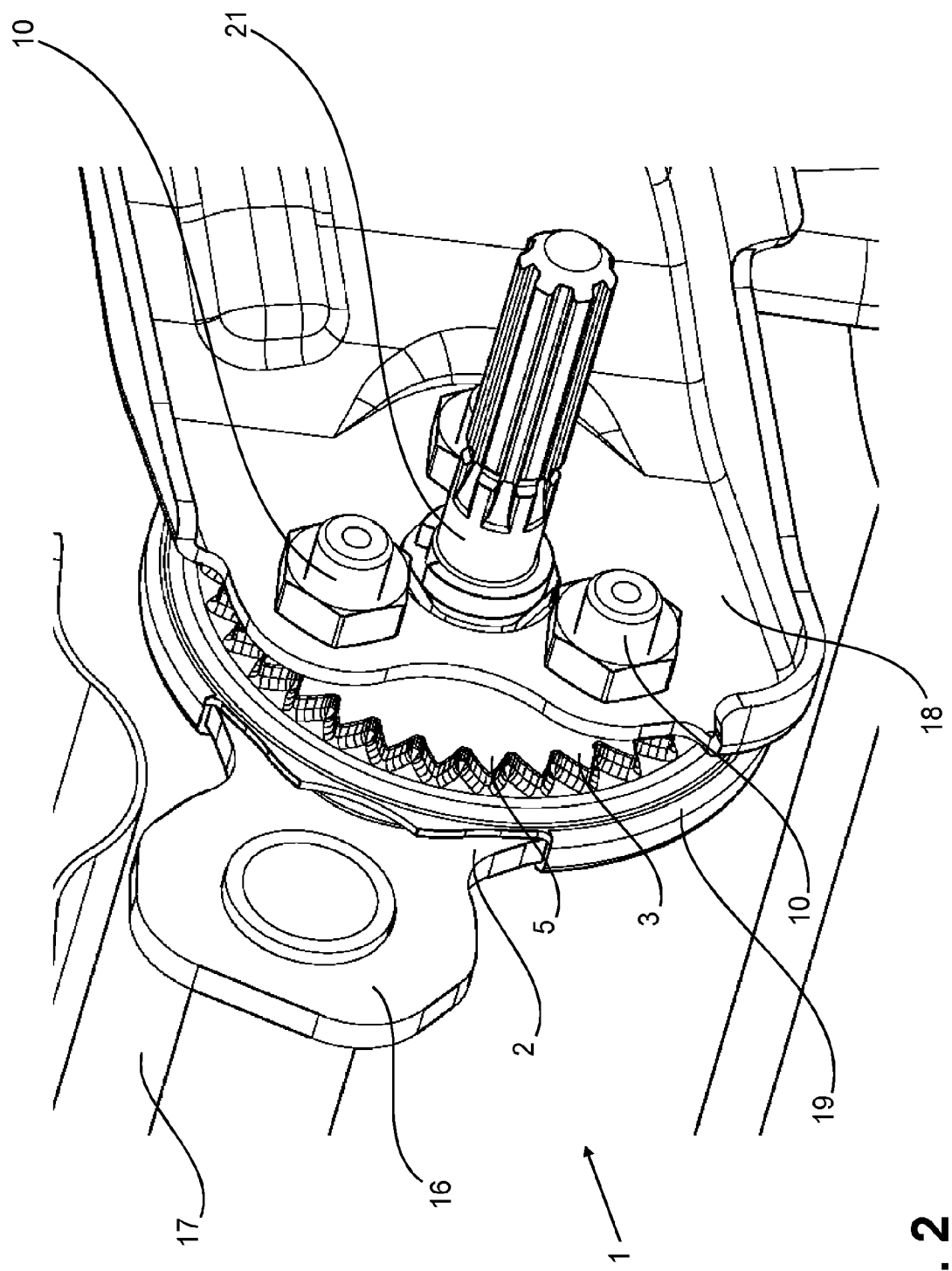
FIG. 2 is a perspective view of the fitting from FIG. 1 in an installed position as a seat inclination adjuster.
Figure 3:
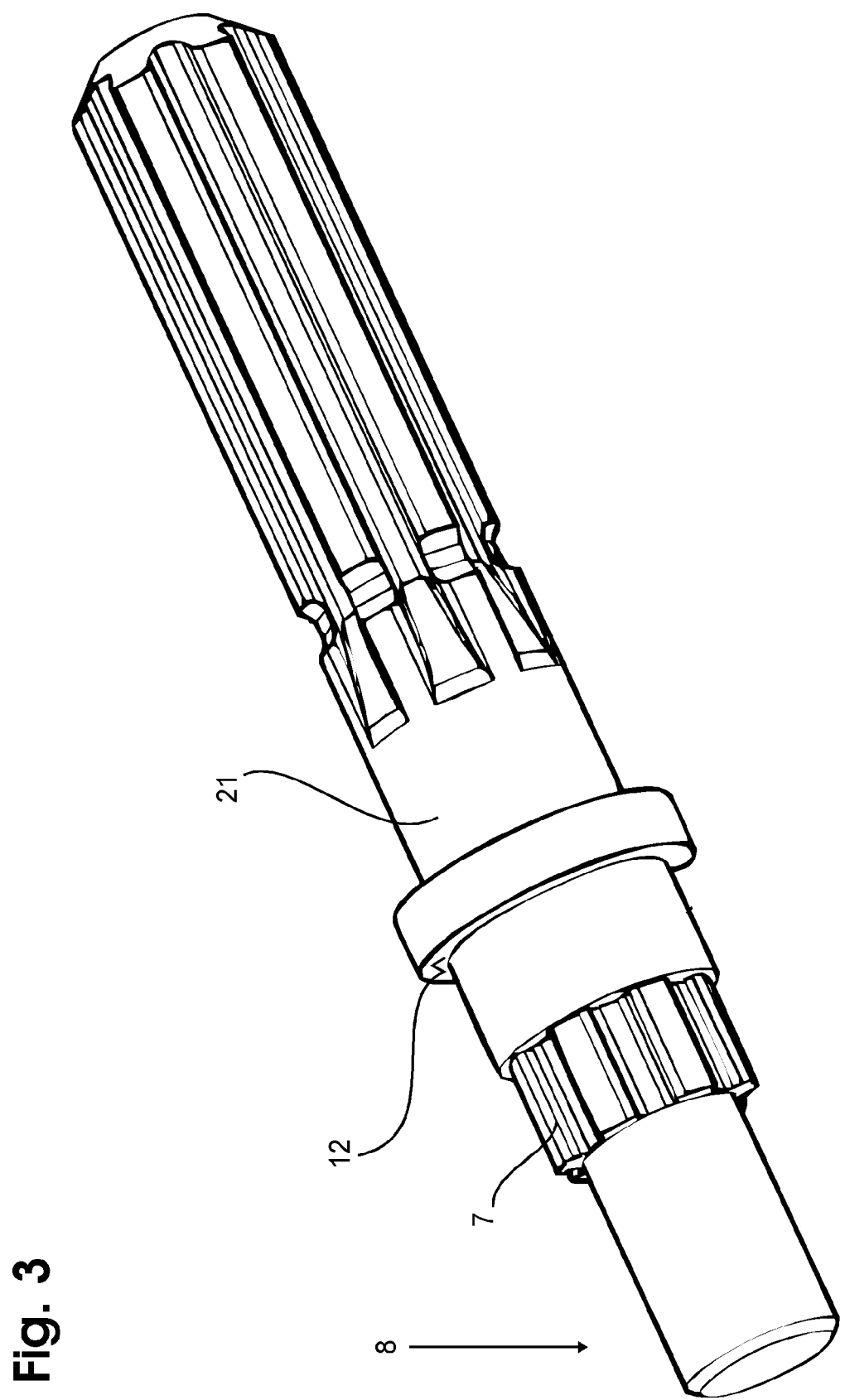
FIG. 3 is a perspective view of the drive shaft of the seat fitting from FIG. 1 before a wobble riveting process.

Referring to the drawings in particular, the embodiment of a seat fitting 1 portrayed in FIG. 1 has a fitting top part 2 and a fitting bottom part 3 (see FIG. 2). The fitting parts 2, 3 are rotatable relative to each other by means of a planetary gear unit (not shown), wherein to drive the planetary gear unit, a pinion 7 of the drive shaft 21 is engaged with a sun wheel of the planetary gear unit. Due to the different number of teeth of a first inner toothing 4 of the fitting top part 2 and a second inner toothing 5 of the fitting bottom part 3, the inner toothings having concentric crown and root circles, rotating the sun wheel by means of the planet gears causes the fitting top part 2 to adjust relative to the fitting bottom part 3.

Figure 4:
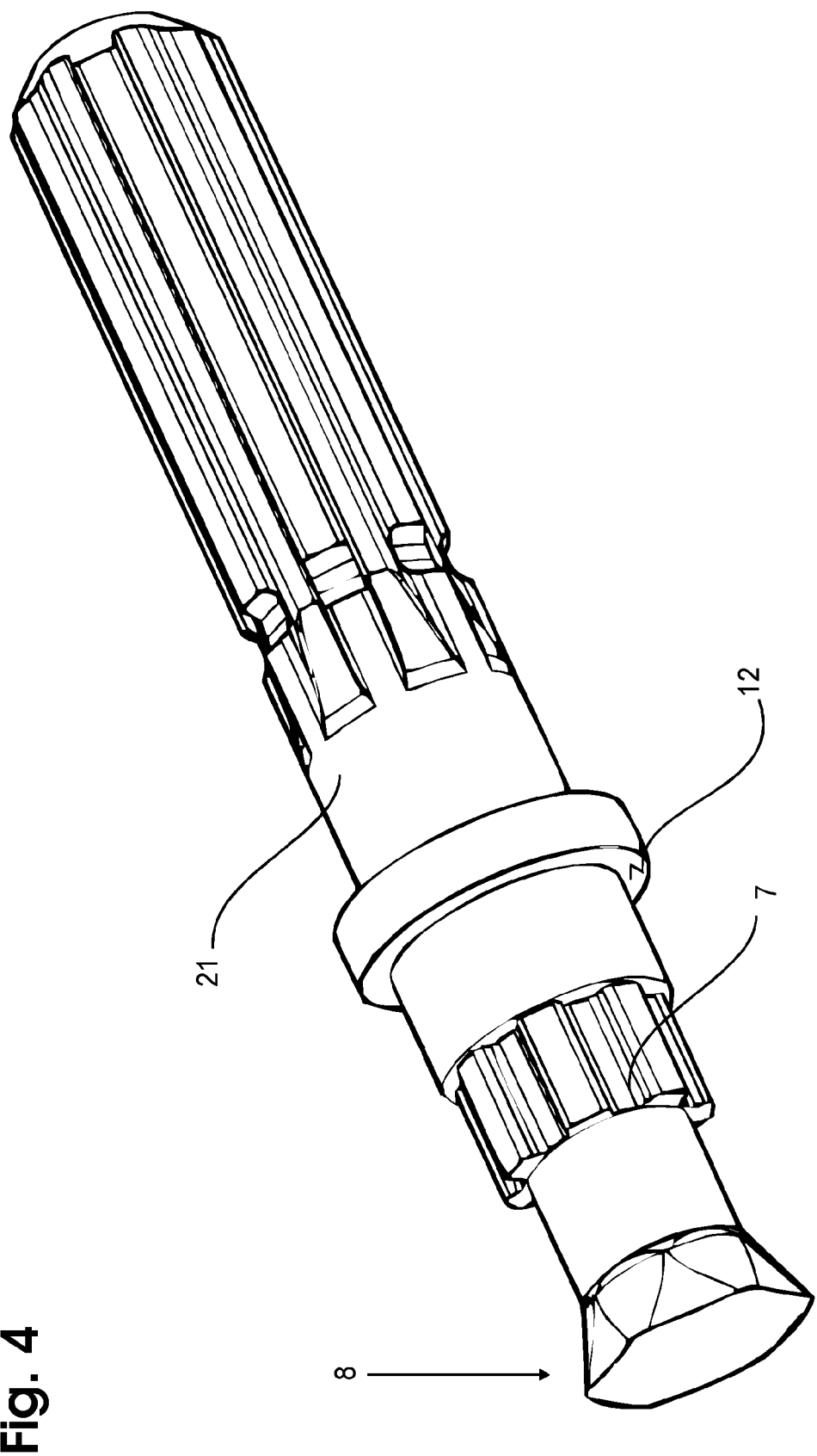
FIG. 4 is a perspective view of the drive shaft from FIG. 3 with a wobble-riveted shaft end.
Figure 5:
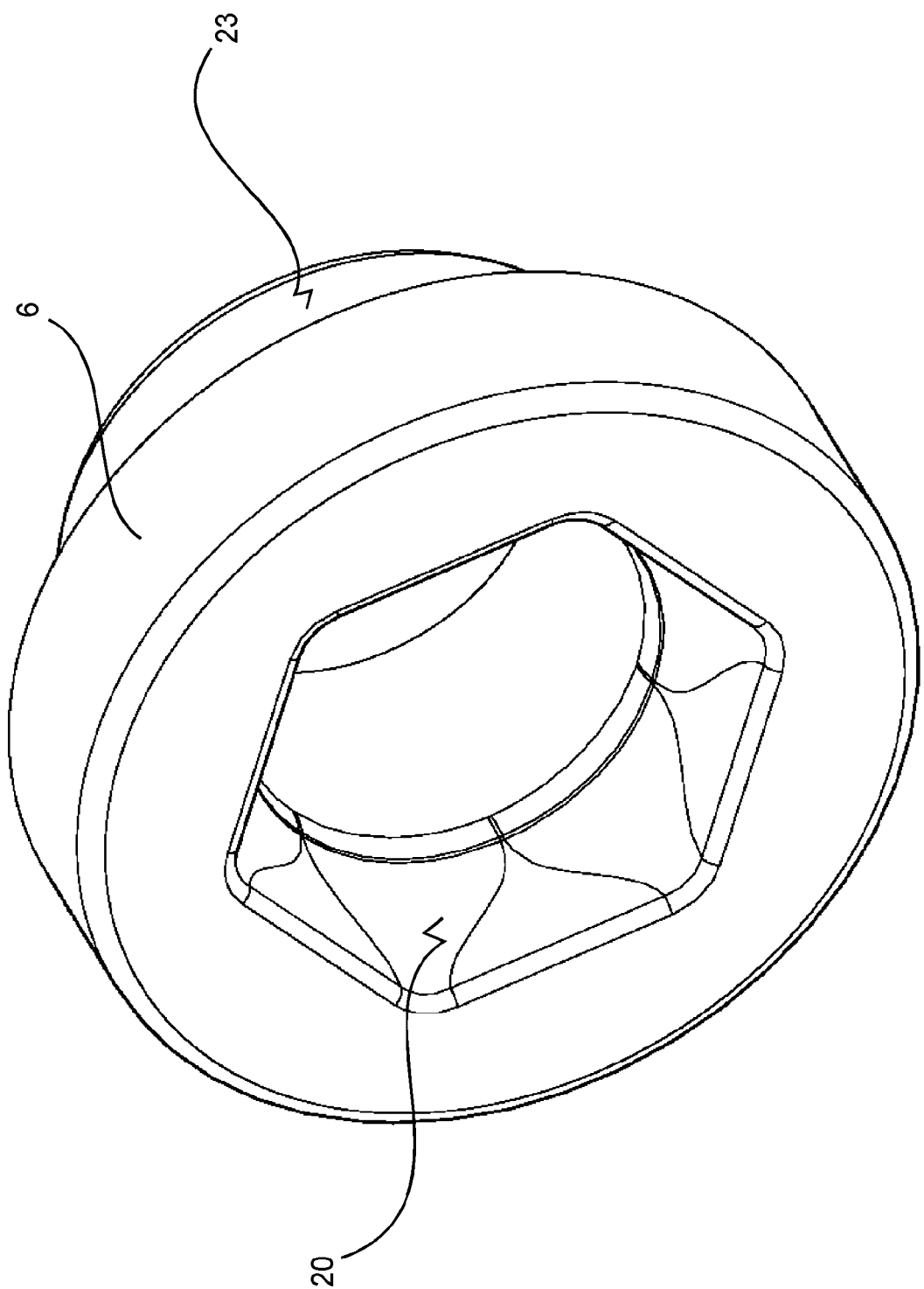
FIG. 5 is a perspective view of the bushing of the seat fitting from FIG. 1.
Figure 6:
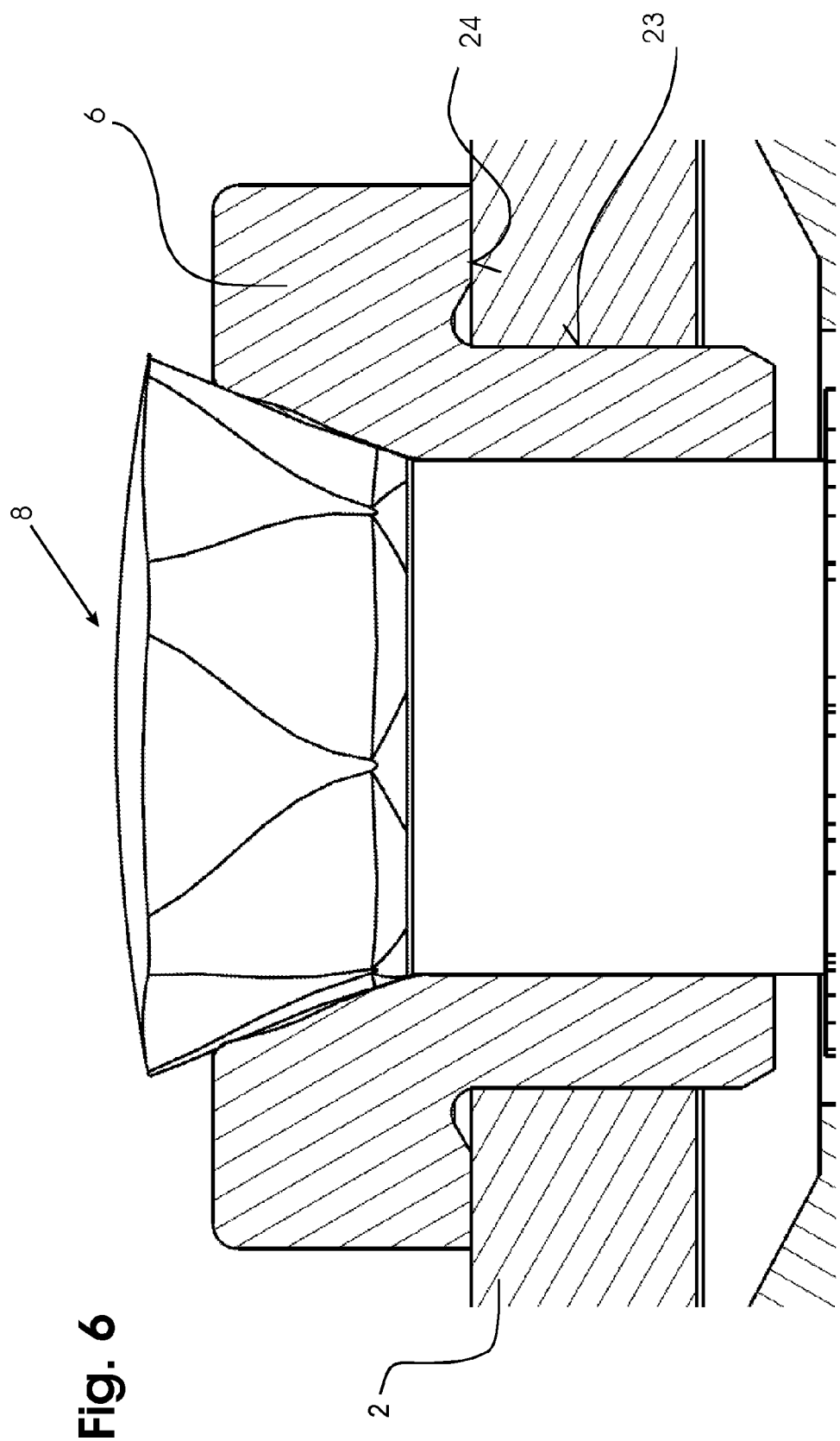
FIG. 6 is a sectional view of a portion of the seat fitting from FIG. 1 in the region of the bushing and the wobble riveted shaft end.

Primarily the drive shaft 21 serves to secure the position of the fitting top part 2 on the fitting bottom part 3. In its installed position in the fitting 1, this drive shaft extends through the seat fitting 1 with one shaft end 8—that is initially unshaped during installation—and through a bushing 6 which is arranged in an opening 11 in the fitting top part 2. To secure the position, the shaft end 8 is wobble riveted after installation, wherein the shape of the shaft end 8 is adapted to the profiled contour 20 within the bushing 6 so that, after the wobble riveting process, the shaft end 8 has the shape shown in FIGS. 1 and 4 in which the shaft end 8 is connected rotatably fixed in a keyed and interference fit with the bushing 6.

In the assembled position, the position of the fitting parts 2, 3 on each other is secured in an axial direction on the one hand by the stop surface 24 of the bushing 6 as well as by the stop 12 on the drive shaft 21, wherein the stop surface 24 rests on the fitting top part and the stop 12 rests on the fitting bottom part 3, and hence on opposite sides on the fitting 1.

When the drive shaft 21 is driven, the stop 12 rotates relative to the fitting bottom part 3, and the bushing 6 rotates relative to the fitting top part 2, wherein the stop surfaces 24 and 23 of the bushing 6 slide on the fitting top part 2 and within the opening 11 (see FIG. 3-6).

In the installed position of the seat fitting 1 as a seat inclination adjuster shown in FIG. 2, the fitting is fastened by means of threaded bolts 10 to an inside of a seat frame 18, wherein the drive shaft 21 enables the fitting 1 to be accessible from the outside through a hole in the seat frame 18, and for example a hand wheel (not shown) on the drive shaft 21 can be used to adjust said drive shaft 21.

To adjust the seat inclination, the top seat fitting 2 has a tab 16 on which a transfer tube 17 is arranged, the other end of which interacts with another fitting 1 (not shown) and is furthermore arranged at a suitable location on the motor vehicle seat such that adjusting the seat fitting 1 causes the seat inclination to adjust.

In addition to the drive shaft 21, a retaining ring 19 serves to secure the position, and it is arranged on the outside of the fitting 1 and overlaps the fitting top part 2 and the fitting bottom part 3.

While specific embodiments of the invention have been shown and described in detail to illustrate the application of the principles of the invention, it will be understood that the invention may be embodied otherwise without departing from such principles.

The invention claimed is:

1. A fitting for an adjusting device of a motor vehicle seat, the fitting comprising:

a fitting top part and a fitting bottom part that is adjustable relative to the fitting top part, wherein the fitting top part and the fitting bottom part are clamped between a bushing and a stop in an axial direction, wherein the fitting top part and the fitting bottom part have an opening arranged coaxially to a fitting axis, wherein through the opening a drive shaft extends at one shaft end in a longitudinal axial direction of the fitting axis;

a transmission gear unit, which is in operative connection with the fitting top part and fitting bottom part, for adjusting the fitting top part relative to the fitting bottom part, wherein the bushing has stop surfaces, wherein a stop of the drive shaft is on a side opposite the bushing, wherein a position of the fitting parts on each other is secured in an axial direction on opposite sides of the fitting by the stop surface of the bushing and by the stop on the drive shaft, wherein the stop surface rests on the fitting top part and the stop rests on the fitting bottom part, wherein the drive shaft has a pinion which is engaged with a sun wheel of the transmission gear unit to drive the transmission gear unit, wherein to secure the position of the fitting top part and fitting bottom part relative to each other the shaft end of the drive shaft after installation has been wobble riveted in a wobble riveting process, wherein a shape of the shaft end is adapted to a profiled contour within the bushing arranged in the opening on the side of the fitting opposite the stop, wherein the shaft end is connected rotatably fixed in a keyed and interference fit with the bushing, wherein the bushing is configured to allow the drive shaft to rotate with a relative movement occurring between the bushing and the opening accommodating the bushing, wherein in case the drive shaft is driven, the stop rotates relative to the fitting bottom part, and the bushing rotates relative to the fitting top part, wherein the stop surfaces of the bushing slide on the fitting top part and within the opening of the fitting, wherein the drive shaft is made of a material that is stress reducible by thermal treating within a temperature range of 150° C. to 250° C., wherein the thermal treating comprises adding heat during finish work, whereby intrinsic stresses caused by wobble riveting are released.

2. The fitting according to claim 1, wherein:
the fitting top part has a first toothing;
the fitting bottom part has a second toothing, arranged coaxially with respect to the first toothing;
at least two planet gears, each rotatably arranged about a respective planet gear longitudinal axis, are engaged with the first toothing and the second toothing on the fitting top part and fitting bottom part; and
the drive shaft, one end of which extends through the fitting, is operatively connected by means of a pinion to the at least two planet gears.

3. The fitting according to claim 1, wherein the drive shaft is produced from a zinc die-cast alloy.

4. The fitting according to claim 1, further comprising:
fastening threaded bolts arranged on the fitting bottom part to fasten the fitting bottom part to an inside of a seat frame; and
a tab for arranging a transfer tube the tab being arranged on the fitting top part.

5. A method for play-free and low-stress assembly of a fitting for a motor vehicle seat inclination adjustment device, the method comprising the steps:
assembling the fitting from:
a fitting upper part having a first toothing,
a fitting bottom part which is adjustable relative to the fitting top part about a fitting axis and has a second toothing arranged coaxially with respect to the first toothing,
a transmission gear unit, which is in operative connection with the fitting upper part and said fitting bottom part, for adjusting the fitting upper part relative to the fitting bottom part, and
a drive shaft having a pinion which is engaged with a sun wheel of said transmission gear unit to drive the transmission gear unit;
wobble riveting the end of the drive shaft extending through the fitting by means of a bushing arranged in an opening in the fitting upper part or fitting bottom part, wherein the fitting upper part and the fitting bottom part are clamped between said bushing and a stop of the drive shaft in an axial direction, wherein the fitting upper part and the fitting bottom part have the opening arranged coaxially to a fitting axis, wherein the drive shaft extends through the opening at one shaft end in a longitudinal axial direction of the fitting axis, wherein the bushing has stop surfaces, wherein the stop of the drive shaft is on a side opposite the bushing, wherein a position of the fitting upper part and the fitting bottom part on each other is secured in an axial direction on opposite sides of the fitting by one of the stop surfaces of the bushing and by the stop on the drive shaft, wherein one of the stop surfaces rests on the fitting upper part and the stop rests on the fitting bottom part, wherein a shape of the shaft end is adapted to a profiled contour within the bushing arranged in the opening on the side of the fitting opposite the stop, wherein the shaft end is connected rotatably fixed in a keyed and interference fit with the bushing, wherein the bushing is configured to allow the drive shaft to rotate with a relative movement occurring between the bushing and the opening accommodating the bushing, wherein in case the drive shaft is driven, the stop rotates relative to the fitting bottom part, and the bushing rotates relative to the fitting top part, wherein the stop surfaces of the bushing slide on the fitting top part and within the opening of the fitting, wherein the drive shaft is made of a material that is stress reducible by thermal treating within a temperature range of 150° C. to 250° C., wherein the thermal treating comprises adding heat during finish work, whereby intrinsic stresses caused by wobble riveting are released.

6. The method according to claim 5, wherein the drive shaft is produced from a zinc die-cast alloy.

7. The method according to claim 5, further comprising:
fastening threaded bolts arranged on the fitting bottom part to fasten the fitting bottom part to an inside of a seat frame; and
a tab for arranging a transfer tube, the tab being arranged on the fitting top part.

\* \* \* \* \*